Patented July 25, 1933

1,919,871

UNITED STATES PATENT OFFICE

TRUMAN B. WAYNE, OF HOUSTON, TEXAS

PROCESS OF RESOLVING EMULSIONS

No Drawing.   Application filed May 31, 1932. Serial No. 614,618.

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

This application is, in part, a division of my copending application Serial No. 539,125, filed May 21, 1931.

The present process consists in subjecting a petroleum emulsion of the water and oil type to the action of small proportions of a complex organic condensation product of high molecular weight, resembling somewhat the synthetic resins produced by the condensation of two or more organic bodies containing resinophore groups selected from the well known group of compounds known to undergo such reactions, e. g. polyhydric alcohols, aldehydes, aldols, ketones, aromatic hydroxy bodies, unsaturated higher aliphatic acids, cyclic carboxylic acids, primary amines, amides, and their substituted derivatives.

The new resolving agents disclosed herein are prepared in such a manner that the condensation reactions are not permitted to proceed to the point where water and/or oil insoluble resins are produced. This may be accomplished in various ways as, for example, by retarding the condensation reactions by the presence of an interfering substance, usually a hydrophilic colloid and/or a solvent which increases its miscibility in water; or through the substitution of certain groups which prevent the formation of hard, insoluble resins, and increase the solubility in water and/or impart a marked hydrotropic effect to the finished product.

While the herein described series of complex condensation products resemble very closely a modified synthetic resin or "plasticizing agent", they are likewise similar in composition to the more complex dye-stuffs, and may be either acidic or basic, depending upon the nature and proportions of the various groups introduced, and may be soluble in either water or oil, depending again on the nature of the completed condensation product, and in certain instances may have a pronounced hydrotropic effect and thus possess many of the properties of a mutual solvent for water-in-oil.

My broad idea contemplates the use of a resolving agent having the general characteristics above described, prepared from various combinations of organic groupings produced in various ways. I attribute the effectiveness of this new type of compound to its high colloidality, coupled with its very pronounced hydrotropic effect, resulting in a very marked action at the interfaces of a water-in-oil emulsion.

While an attempt will be made to define the course of the various chemical reactions involved in the preparation of these products, and approximately state their composition, it is to be understood, however, that the invention is not dependent on any theory herein expressed as to the course of the reactions or as to the composition of the products except as defined in the appended claims.

As stated above, a composition of the desired properties may be prepared by substituting certain groups in the complex organic condensation products prepared by the reaction of organic compounds containing resinophore groups. For example, the condensation product of synthetic resin type may be modified by the introduction of one or more organic groupings selected from the group comprising alkyl, cyclo-alkyl, aralkyl, sulfonic, and carboxyl groups. In some instances, the modifying agent may be a detergent body. Specifically, the modifying agent may be an acid selected from the group comprising organic soap-forming sulfonic, carboxylic, and sulfo-carboxylic acids, or their salts, esters or amides. Further, modified fatty acids and residues from modified fatty acids may constitute modifying agents. Other specific compounds suitable for use are indicated below and it will be noted that in many instances the final complex condensation product employed as the resolving agent may contain several modifying groupings.

In addition to the features which characterize this new type of compound which are set forth above it is to be noted that many of the products are capable of undergoing saponification with alkalis. Moreover, many of the complex condensation products are very stable toward calcium and magnesium salts, and may be successfully used in relatively small proportions on petroleum emulsions which contain natural hard waters in a finely emulsified condition, and which do not readily respond to treatment with the usual commercial resolving compounds based on modified fatty acids, because of the formation of water-insoluble, oil-soluble calcium and magnesium soaps.

In the broad aspect, the present process contemplates the resolving of petroleum emulsions by adding thereto a complex condensation product of the modified synthetic resin type prepared from a phenolic body and one or more aliphatic bodies containing resinophore groups.

The term "phenolic bodies" is used herein for purposes of clearness and conciseness in the subsequent description. This class of substances includes phenol, its homologues, the monocyclic cresols, also dicyclic bodies of the nature of naphthol and its homologues. Di- and tri-hydric phenols and many of the poly-hydric hydroxy derivatives of naphthalene and anthracene possess reactive qualities of the same general type, and are suitable for my purposes. Furthermore, substitution products of the above mentioned types of substances may be used, for instance nitro, chloro, sulfonic, carboxylic, and alkoxy, such as methoxy and ethoxy, derivatives. This class of substances comprises those bodies which may be used as one of the two general classes of reacting substances contemplated in the present invention, and is herein designated as "a phenolic body". As will be understood by those skilled in the art these "phenolic bodies" are all hydroxy aromatic bodies.

The aliphatic bodies constituting the second general class or type of reacting substances may be selected from the various polyhydric alcohols, aldehydes, ketones, and higher fatty acids of the aliphatic series which are known to undergo resinifying reactions with phenolic bodies and their various derivatives, as set forth above. For instance, aliphatic polyhydric alcohols such as ethylene glycol, propylene glycol, or glycerin may be used. Obviously, also, their alkyl ether derivatives such as the monoethyl ether of ethylene glycol, and the ether aliphatic alcohols such as diethylene glycol and their ether derivatives are likewise suitable. Among the suitable aliphatic aldehydes are formaldehyde, acetaldehyde, or butyraldehyde, and their polymerization products. Acetone, methylethylketone, and dipropylketone are some of the suitable aliphatic ketones. The higher fatty acids containing more than eight carbon atoms in the molecule such as stearic, oleic, linoleic, ricinoleic, and others, are adapted to my purpose. It is obvious, also, that the esters of these fatty acids with polyhydric alcohols may be used.

These substances are employed in the production of the hard, infusible, and insoluble resinoids (synthetic resins) of commerce. The final products have an extremely high molecular weight. I have discovered that by causing these reactions to proceed under conditions which prevent the formation of hard resins, highly effective demulsifiers for petroleum emulsions may be prepared. This is accomplished by introducing groups which act as modifying agents, as previously stated.

The distinguishing structural characteristics of the following reaction products of "a phenolic body" and one or more chemical individuals of the aliphatic series, are the presence of one or more phenyl, phenylene, naphthyl, or similar groups or residues in intimate association with the corresponding aliphatic residues resulting from the dehydration processes incidental to condensation and polymerization. Furthermore, the process of dehydration may be complicated by more far-reaching transformations, transpositions, or rearrangements of the molecule. The scarcity of analytical data on the resinoids makes any endeavor to accurately delineate their constitution a difficult matter.

The products prepared and employed in the present invention should not be confused with the simple condensation products prepared by condensing cyclic or poly-cyclic aromatic hydrocarbons with fatty bodies and sulfuric acid at temperatures between 20° and 70° C. Products of this type are classed as "sulfo-aromatic compounds of the Twitchell type", and are characterized by the presence of one carboxyl group for each mol. of fatty acid condensed with one mol. of the aromatic body, and one or more sulfonic groups. The condensation is usually effected in a manner which preserves the carboxyl group, and prevents the production of resinous bodies.

In order to illustrate specifically the new type of complex condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their substituted derivatives, and other proportions, may be employed without departing from the spirit of the invention or the scope of the appended claims. My broad idea contemplates the formation of condensation products similar to the well known synthetic resins and plastics formed by the condensation reactions between chemical bodies or groups of the character mentioned above, but differing from these insoluble resins in that they are highly colloidal and usually water-soluble as a result of the incorporation therein of organic residues by nuclear substitution and condensation reactions which form complex products of very high molecular weight possessing the desired colloidality and wetting properties.

*Example 1*

A thick resin which may be sulfonated to render it water-soluble may be prepared by heating together at an elevated temperature a phenolic body, a polyhydric alcohol, and a fatty body. In preferred practice the product is prepared by heating together molecular quantities of phthalic acid or its anhydride, diethylene glycol, and oleic acid at 100–210° C. The thick resin produced is sulfonated preferably with an equal volume of chloro-sulfonic acid or oleum at approximately 90–140° C. to render it water soluble. The material may be freed from its excess of acid by any of the usual methods and used as the acidic mass or in the neutralized state is a demulsifier for petroleum emulsions.

*Example 2*

A molecular proportion of a higher unsaturated fatty acid, such as oleic or ricinoleic acid, is dissolved in a greater than molecular proportion of an alkyl ether derivative of a polyhydric alcohol, such as ethylene glycol monoethyl ether, and heated under a reflux condenser for about four hours. A molecular quantity of a phenol, phenoloid body, or other aromatic body capable of producing resinous or colloidal substances, such as ordinary phenol or cresylic acid, is dissolved in an excess of oleum and slowly added to the ether-alcohol ester of the fatty acid, and the mass heated until a sulfonated, water-soluble condensation product is obtained. The mass is freed from the excess sulfuric acid by any of the conventional procedures, and is used in the dehydration of petroleum emulsions, or may be converted into its potassim, sodium, or ammonium salt, or may be condensed with aliphatic or aromatic amines in the manner to be disclosed later in the specification.

*Example 3*

1 mol. each of anisole (phenyl methyl ether), formaldehyde in 40 per cent. solution, and oleic acid are heated at 80–100° C. for 2 hours to condense to a resinous material which is cautiously treated at room temperature (20–35° C.) with an excess of oleum until water-soluble. The sulfonated resin of high molecular weight so produced is an active wetting agent, and of great value in the dehydration of petroleum emulsions when used either as the acidic mass or in the form of its sodium, potassium, or ammonium salt.

*Example 4*

According to another embodiment of the invention an alkyl phenol is condensed with a ketone, the condensation preferably being effected in the presence of a mineral acid. The resulting product is added to strong sulfuric acid and heated until the mass thickens, whereupon the resulting mass is mixed with a fatty acid ester of a polyhydric alcohol and stirred to bring about sulfonation and condensation. The resulting mass is then washed with water to remove the free acid and may be used as such or may be converted into a water-soluble salt or into an amide or ester.

In the preferred practice of this embodiment of the invention, 100 parts of an alkyl phenol, such as m- or p-cresol, or a mixture of the two, are condensed with a molecular proportion of a ketone, such as acetone, by warming below 100° C. in the presence of a small quantity of mineral acid. The condensation may be effected in the presence of hydrochloric acid at a temperature of 30°–40° C. by prolonged standing, or may be more quickly effected by heating the mass at 60°–70° C. for about four hours. The initial condensation product so formed is then slowly added to an equal volume of 98 per cent. sulfuric acid or oleum and heated at about 100° C. until the mass thickens appreciably. It is then slowly run into 200 parts of a fatty acid ester of a polyhydric alcohol, such as olein, castor oil, or linseed oil, and stirred to sulfonate and condense. The acid mass is then preferably washed with an equal volume of water to remove free mineral acid. The complex water-soluble condensation product so obtained may be used in the dehydration of petroleum emulsions in the form of the acid mass, or may be converted into the corresponding ammonium, sodium, or potassium salt, or into an amino derivative or ester by combining it with an amine or alcohol, respectively.

An alternative procedure would be to combine an alkyl-phenol, an aldehyde or ketone, and a polyhydric alcohol to form the initial condensation product which, after sulfonation as described above, is condensed with an aliphatic fatty acid containing more than 8 carbon atoms, and washed to remove free mineral acid.

*Example 5*

100 parts of the acid condensation product prepared according to Example 4 are condensed with from 100 to 500 parts of b-naphthalene sulfonic acid or a nuclear-substituted aromatic sulfonic acid such as isopropyl naphthalene sulfonic acid, by warming at 80°–100° C. The mass is diluted with water until an upper layer separates, which is drawn off and used as a demulsifier in the acid state or converted into its ammonium, sodium, or potassium salt, or into an ester by esterification with an alcohol, or into an amino derivative by condensation with an organic base such as dimethylaniline, diethylaniline, triethanolamine, or the like. The demulsifiers of this type are highly colloidal in water solution, mix readily with oil, and are unusually effective agents for the resolving of petroleum emulsions.

*Example 6*

The washed acidic condensation product such as that prepared in accordance with the preceding example may be further condensed with a suitable compound or grouping to provide a resulting water or oil soluble amino derivative. For example, the acid condensation product may be condensed with primary, secondary, or tertiary aliphatic amines or alkyl substituted aromatic amines which yield water or oil soluble derivatives. In preferred practice I employ an alkyl amine, particularly one which contains one or more hydroxylated aliphatic groups, such as mono-, di-, or tri-ethanolamine. Products of this type have been found to be unusually effective agents for resolving petroleum emulsions.

As a specific example of this embodiment of the invention, 500 parts of the acid condensation product prepared according to the method covered in Example 5, which may be freed from its excess of mineral acid by any well known method, are combined with 50 parts of diethanolamine.

The reaction between the acidic condensation product and an aromatic primary or secondary amine involves acylation of the amine through replacement of one or both of the hydrogen atoms of the amino group, $.NH_2$. This is effected by heating the mixture at elevated temperatures.

In the case of an aliphatic amine, for instance a dialkylamine, the reaction product may be simply the substituted ammonium salt of the type (1) 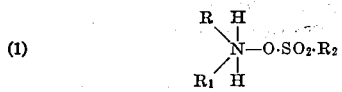

wherein R and $R_1$ represent alkyl groups, and $R_2$ is the radical attached to the sulfonic or carboxyl group. This is the ordinary neutralization reaction which does not involve any substitution of the hydrogens attached to the nitrogen. However, acylation of the amine by the acidic condensation product is also possible by heating the mass at elevated temperatures for some time. The substituted ammonium salt undergoes a rearrangement and forms an acylated derivative of the amine while eliminating a molecule of water. This reaction takes place according to the following general scheme:

(2) 

wherein R is alkyl, $R_1$ is alkyl or H, $R_2$ is the radical attached to the sulfonic or carboxyl group, X.OH, of the acidic resinoid body, and N is the nitrogen atom.

The water solubility of the product is usually increased by condensing the acidic resinoid body with aliphatic amines or aromatic amines containing alkyl groups in the side-chain according to Formula (1). On the other hand, products of the $R.R_1.N.X.R_2$ type indicated in Reaction (2) are very soluble in petroleum products, and form colloidally hydrated aqueous solutions.

Where much larger than stoichimetrical proportions of the acidic condensation product are used, a third type of reaction involving esterification of the hydroxyl groups of the hydroxylated aliphatic amine also occurs. This may occur simultaneously with the acylation of the amino group, and thus provides a very complex condensation product which is a highly efficient demulsifier for petroleum emulsions. The reaction would then probably take place according to the following general scheme:

(3) 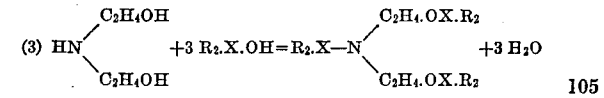

wherein $R_2$ is the radical attached to the sulfonic or carboxyl group, X.OH, of the acidic resinoid body employed as an acylating agent, and N is the nitrogen atom.

Such condensation products may be exemplified by the following type formula:

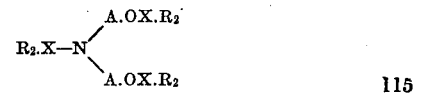

wherein $R_2.X$ is the resinoid radical attached to the nitrogen atom, N; and $A.OX.R_2$ is the ester produced by esterification of the hydroxyl groups of the alkyl radical, A.

It is obvious that many permutations and combinations of substances may be prepared from the various reactive bodies known to undergo resinification, and that only a few examples can be given in the specification. It is also obvious that two or more of the resins produced may be further condensed and then combined with a nuclear-substituted aromatic sulfonic acid, and that alkylation and sulfonation can often be conducted simultaneously with resinification in many cases.

Proportions of reacting substances, temperatures, time of heating, etc., are specified in some of the preceding examples while more general directions only are given in others. Obviously, many permutations and combinations in proportions of reacting bodies are made possible by varying the time of heating and/or the temperatures used. For example, if molecular proportions of a phenoloid body and an aldehyde are heated to a certain temperature for $n$ minutes to form a water-soluble condensation product, it is obvious that if only one-half mol of aldehyde is used, the heating must be extended or the temperature raised, or both, to obtain a condensation product of the same physical characteristics. Conversely, if two mols of aldehyde are used either the temperature must be reduced or the time of heating shortened, or both, to prevent the condensation from proceeding to the point where insoluble resins are obtained. The properties of the particular aldehydes, alcohols, fatty acids, etc., used will likewise influence the procedure employed in the preparation of these soluble resinous bodies as will also the nature of the organic residues present substituted derivatives of the various polyhydric alcohols, aldehydes, phenoloid bodies, amines, etc. These various considerations, however, are within the knowledge and practices of the trained organic chemist and will be readily understood by those skilled in the art.

Where reference is made in the appended claims to "carboxyl and sulfonic groups" it is to be understood that this refers to the presence of COOH and $SO_2.OH$ groups respectively, and also to the products formed when they are neutralized by a metallic base, ammonia, or organic amine. Equivalents of these groups are also contemplated.

The term "water-soluble" is used to include the property of forming colloidally hydrated aqueous solution.

The improved treating agents prepared in accordance with the present invention are used in the proportion of one part of treating agent to form 2,000 to 20,000 parts of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I do not make any claim to the simpler condensation products of the substituted sulfonic acids such as those produced by treating the latter with aldehydes, polyhydric alcohols, and fatty acids, such as those claimed by other inventors, as many of these involve only the linking of two cyclic or polycyclic groups by means of an aldehyde bridge or a similar condensation reaction.

I claim:

1. The process of resolving water-in-o emulsions which comprises adding thereto highly colloidal complex condensation pro uct of the modified synthetic resin ty prepared from a phenolic body and one more aliphatic bodies containing resin phore groups, together with a modifyir agent capable of preventing the productic of a reaction product of the hard, insolubl synthetic resin type.

2. The process of resolving water-in-c emulsions which comprises adding there a highly colloidal complex condensation pr duct of the modified synthetic resin ty prepared from a phenolic body and an a phatic body containing resinophore grou selected from the group comprising pol hydric alcohols, higher fatty acids, and ald hydes of the aliphatic series, together with modifying agent capable of preventing t production of a reaction product of t hard, insoluble, synthetic resin type.

3. The process of resolving water-in- emulsions which comprises adding thereto highly colloidal complex condensation pro uct of the modified synthetic resin type p pared from a phenolic body and a polyh dric alcohol, together with a modifyi agent, comprising a fatty body, capable preventing the production of a reaction pr uct of the hard, insoluble, synthetic re type.

4. The process of resolving water-in- emulsions which comprises adding theret complex condensation product of the m ified synthetic resin type prepared from phenolic body, one or more aliphatic bod containing resinophore groups, and a clear-substituted aromatic sulfonic acid 5. The process of resolving water-in- emulsions which comprises adding theret complex condensation product of the mo fied synthetic resin type prepared from phenolic body, a polyhydric alcohol of aliphatic series, and a nuclear-substitu aromatic sulfonic acid.

6. The process of resolving water-in emulsions which comprises adding theret complex condensation product of the mc fied synthetic resin type prepared from phenolic body, an aldehyde of the aliph series, and a nuclear-substituted arom sulfonic acid.

7. The process of resolving water-in emulsions which comprises adding theret complex condensation product of the mc fied synthetic resin type prepared from phenolic body, a polyhydric alcohol, an dehyde of the aliphatic series, and a nucl substituted aromatic sulfonic acid.

8. The process of resolving water-in ulsions which comprises adding thereto a complex condensation product of the modified synthetic resin type prepared from a phenolic body, a polyhydric alcohol, an aldehyde of the aliphatic series, a fatty acid having more than eight carbon atoms, and a nuclear-substituted aromatic sulfonic acid.

. The process of resolving water-in-oil emulsions which comprises adding thereto a treating agent comprising a water-soluble derivative of the condensation product of a phenolic body, a polyhydric alcohol, and an aromatic compound selected from the group comprising aromatic sulfonic acids and nuclear-substituted derivatives thereof, said water-soluble derivatives being a salt, ester, or amino derivative thereof.

10. The process of resolving water-in-oil emulsions which comprises adding thereto a treating agent comprising a complex condensation product of a phenolic body, a polyhydric alcohol, an aldehyde, and an aromatic compound selected from the group comprising aromatic sulfonic acids and nuclear-substituted derivatives thereof.

11. The process of resolving water-in-oil emulsions which comprises adding thereto a treating agent comprising a water-soluble derivative of the condensation product of a phenolic body, a polyhydric alcohol, an aldehyde, and an aromatic compound selected from the group comprising aromatic sulfonic acids and nuclear-substituted derivatives thereof, said water-soluble derivative being a salt, ester, or amino derivative thereof.

. The process of resolving water-in-oil emulsions which comprises adding thereto a treating agent comprising a complex condensation product of a phenolic body, a polyhydric alcohol, an aldehyde, a nuclear-substituted aromatic sulfonic acid, and an alkylamine containing a hydroxylated aliphatic group.

. The process of resolving water-in-oil emulsions which comprises adding thereto a water-soluble derivative of the condensation product of a phenolic body, a polyhydric alcohol, a compound selected from the group comprising aldehydes and aldols, a fatty acid having more than either carbon atoms, and an aromatic compound selected from the group comprising aromatic sulfonic acids and nuclear-substituted derivatives thereof, said water-soluble derivative being a salt, ester, or amino derivative.

The process of resolving water-in-oil emulsions which comprises adding thereto a treating agent comprising a complex condensation product of a phenolic body, a polyhydric alcohol, an aldehyde, a fatty acid having more than eight carbon atoms, a nuclear-substituted aromatic sulfonic acid, and an alkylamine containing a hydroxylated aliphatic group.

15. The process of resolving water-in-oil emulsions which comprises adding thereto the condensation product of an alkyl amine and a resinoid body prepared from a phenolic body and one or more aliphatic bodies containing resinophore groups, together with a modifying agent capable of preventing the production of a reaction product of the hard, insoluble, synthetic resin type.

16. The process of resolving water-in-oil emulsions which comprises adding thereto the condensation product of an alkyl amine and a resinoid body characterized by the presence of one or more aromatic residues from a phenolic body linked with residues from members of the aliphatic series.

17. The process of resolving petroleum emulsions which comprises adding thereto a treating agent comprising a water-soluble substituted ammonium salt of the general type $R.R_1.HN.X.OH.R_2$ wherein R is alkyl, $R_1$ is alkyl or hyrodgen, NH is an imino group, X.OH is a carboxyl or sulfo group, and $R_2$ is a complex resinoid body, said resinoid body being characterized by the presence of one or more aromatic residues from a phenolic body linked with residues from members of the aliphatic series.

18. The process of resolving petroleum emulsions which comprises adding thereto a treating agent comprising an oil-soluble substituted amine of the general type $$R.R_1.N.X.R_2$$

wherein R is alkyl, $R_1$ is alkyl or hydrogen, N is a nitrogen atom, X is a residue from a sulfo or carboxyl group, and $R_2$ is a complex resinoid body, said resinoid body being characterized by the presence of one or more aromatic residues from a phenolic body linked with residues from members of the aliphatic series.

19. The process of resolving petroleum emulsions which comprises adding thereto a treating agent comprising a substituted amine of the general type

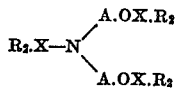

wherein $A.OX.R_2$ is the ester radical produced by esterification of the hydroxyl groups of the alkyl radical or radicals, A, N is a nitrogen atom, and $R_2.X$ is the residue from the complex resinoid body, $R_2.X.OH$, said resinoid body being characterized by the presence of one or more aromatic residues from a phenolic body linked with residues from members of the aliphatic series.

TRUMAN B. WAYNE.